(12) United States Patent
Mameri et al.

(10) Patent No.: US 8,954,939 B2
(45) Date of Patent: Feb. 10, 2015

(54) EXTENDING A DEVELOPMENT ENVIRONMENT

(71) Applicant: Microsoft Corporation, Redmond, WA (US)

(72) Inventors: Frederico A. Mameri, Seattle, WA (US); Michael C. Fanning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 19 days.

(21) Appl. No.: 13/732,073

(22) Filed: Dec. 31, 2012

(65) Prior Publication Data

US 2014/0189662 A1    Jul. 3, 2014

(51) Int. Cl.
  *G06F 9/45* (2006.01)
  *G06F 9/44* (2006.01)

(52) U.S. Cl.
  CPC .. *G06F 8/41* (2013.01); *G06F 8/40* (2013.01); *G06F 8/427* (2013.01); *G06F 8/30* (2013.01)
  USPC ............ 717/140; 717/142; 717/143; 717/106

(58) Field of Classification Search
  CPC .............. G06F 8/41; G06F 8/30; G06F 8/427
  USPC .......................................... 717/142, 143, 106
  See application file for complete search history.

(56) References Cited

U.S. PATENT DOCUMENTS

| | | | |
|---|---|---|---|
| 5,535,391 A | 7/1996 | Hejlsberg et al. | |
| 5,845,118 A | 12/1998 | Gheith | |
| 5,892,950 A * | 4/1999 | Rigori et al. | 717/146 |
| 5,923,882 A | 7/1999 | Ho | |
| 6,175,948 B1 | 1/2001 | Miller et al. | |
| 6,202,205 B1 * | 3/2001 | Saboff et al. | 717/151 |
| 6,219,834 B1 * | 4/2001 | Soroker et al. | 717/145 |
| 6,275,986 B1 | 8/2001 | Ewart | |
| 6,289,506 B1 | 9/2001 | Kwong | |
| 6,292,938 B1 | 9/2001 | Sarkar et al. | |
| 6,804,682 B1 | 10/2004 | Kemper et al. | |
| 6,807,548 B1 | 10/2004 | Kemper | |
| 6,895,578 B1 | 5/2005 | Kolawa | |
| 6,954,845 B2 * | 10/2005 | Arnold et al. | 712/36 |
| 6,973,646 B1 | 12/2005 | Bordawekar | |
| 7,219,338 B2 | 5/2007 | Venter | |
| 7,305,666 B2 * | 12/2007 | Burger et al. | 717/140 |

(Continued)

OTHER PUBLICATIONS

U.S. Official Action dated Mar. 12, 2014 in U.S. Appl. No. 13/149,693.

(Continued)

*Primary Examiner* — Phillip H Nguyen
(74) *Attorney, Agent, or Firm* — Jessica Meyers; Jim Ross; Micky Minhas

(57) ABSTRACT

Concepts and technologies are described herein for extending the behavior of a software development tool. An extension can be accessed and consumed by a software development tool to configure the software development tool to perform an operation in an extended mode. In one example, an extension can extend a compiler based on the input source code. In one configuration, the compiler extension can provide a compiler with one or more runtime semantics of various source code elements for a particular programming language. The compiler can access an extensions list to determine if the compiler is to perform a compilation operation on a particular source code element or logical unit in an extended mode.

20 Claims, 6 Drawing Sheets

(56) References Cited

U.S. PATENT DOCUMENTS

| | | | |
|---|---|---|---|
| 7,370,318 B1 | 5/2008 | Howe et al. | |
| 7,373,642 B2* | 5/2008 | Williams et al. | 717/160 |
| 7,434,209 B2 | 10/2008 | Brown | |
| 7,441,237 B2* | 10/2008 | Warren et al. | 717/140 |
| 7,451,435 B2 | 11/2008 | Hunt et al. | |
| 7,493,610 B1 | 2/2009 | Onodera | |
| 7,530,056 B1 | 5/2009 | Yaari | |
| 7,650,600 B2 | 1/2010 | King | |
| 7,730,448 B2 | 6/2010 | Meijer | |
| 8,060,868 B2 | 11/2011 | Meijer et al. | |
| 8,239,847 B2 | 8/2012 | Yu et al. | |
| 8,276,130 B2 | 9/2012 | Wang | |
| 8,296,721 B2* | 10/2012 | Sivaram | 717/104 |
| 8,533,672 B2* | 9/2013 | Sikka et al. | 717/114 |
| 8,555,250 B2 | 10/2013 | Fanning et al. | |
| 2002/0032900 A1* | 3/2002 | Charisius et al. | 717/2 |
| 2002/0162091 A1 | 10/2002 | Crocker et al. | |
| 2004/0049763 A1 | 3/2004 | Bloch et al. | |
| 2004/0117778 A1 | 6/2004 | Sehr et al. | |
| 2004/0194068 A1* | 9/2004 | Warren et al. | 717/136 |
| 2005/0159828 A1* | 7/2005 | Deininger et al. | 700/87 |
| 2006/0048097 A1 | 3/2006 | Doshi | |
| 2007/0038978 A1 | 2/2007 | Meijer et al. | |
| 2007/0055962 A1* | 3/2007 | Meijer et al. | 717/140 |
| 2007/0074188 A1 | 3/2007 | Huang | |
| 2007/0078823 A1 | 4/2007 | Ravindran et al. | |
| 2007/0169036 A1 | 7/2007 | Garner et al. | |
| 2007/0220480 A1 | 9/2007 | Waldman et al. | |
| 2007/0220486 A1 | 9/2007 | Lammel | |
| 2007/0226708 A1 | 9/2007 | Varma | |
| 2007/0234288 A1 | 10/2007 | Lindsey et al. | |
| 2008/0066063 A1 | 3/2008 | Pouliot et al. | |
| 2008/0162885 A1 | 7/2008 | Wang et al. | |
| 2008/0235660 A1 | 9/2008 | Chapman et al. | |
| 2008/0295083 A1 | 11/2008 | Meijer et al. | |
| 2008/0320440 A1 | 12/2008 | Meijer et al. | |
| 2009/0024986 A1 | 1/2009 | Meijer | |
| 2009/0077543 A1 | 3/2009 | Siskind et al. | |
| 2009/0241090 A1* | 9/2009 | Anlauff et al. | 717/114 |
| 2009/0313604 A1 | 12/2009 | Miceli | |
| 2009/0319995 A1 | 12/2009 | Gawor | |
| 2010/0083233 A1 | 4/2010 | Vanoverberghe | |
| 2010/0106949 A1 | 4/2010 | Komatsu et al. | |
| 2010/0218173 A1 | 8/2010 | Aharoni et al. | |
| 2010/0218174 A1 | 8/2010 | Schneider | |
| 2010/0257404 A1 | 10/2010 | Singh et al. | |
| 2010/0269094 A1* | 10/2010 | Levenshteyn et al. | 717/109 |
| 2010/0299658 A1 | 11/2010 | Ng | |
| 2011/0138361 A1 | 6/2011 | McEntee et al. | |
| 2011/0138373 A1 | 6/2011 | Lane et al. | |
| 2011/0154122 A1 | 6/2011 | Li et al. | |
| 2011/0202902 A1 | 8/2011 | Whelan | |
| 2011/0258593 A1 | 10/2011 | Ng et al. | |
| 2011/0271260 A1 | 11/2011 | Kwon et al. | |
| 2012/0011493 A1 | 1/2012 | Singh et al. | |
| 2012/0192169 A1 | 7/2012 | Li et al. | |
| 2012/0311533 A1 | 12/2012 | Fanning et al. | |
| 2012/0311535 A1 | 12/2012 | Fanning et al. | |
| 2012/0311536 A1 | 12/2012 | Fanning et al. | |
| 2012/0311546 A1 | 12/2012 | Fanning et al. | |

OTHER PUBLICATIONS

U.S. Official Action dated Sep. 11, 2013 in U.S. Appl. No. 13/149,693.
U.S. Official Action dated Feb. 22, 2013 in U.S. Appl. No. 13/149,651.
U.S. Notice of Allowance dated Jun. 5, 2013 in U.S. Appl. No. 13/149,651.
U.S. Official Action dated Jan. 30, 2013 in U.S. Appl. No. 13/149,665.
U.S. Official Action dated May 23, 2013 in U.S. Appl. No. 13/149,665.
U.S. Notice of Allowance dated Nov. 21, 2013 in U.S. Appl. No. 13/149,665.
U.S. Official Action dated Oct. 2, 2012 in U.S. Appl. No. 13/149,676.
U.S. Official Action dated Mar. 22, 2013 in U.S. Appl. No. 13/149,676.
U.S. Official Action dated Jul. 19, 2013 in U.S. Appl. No. 13/149,676.
U.S. Notice of Allowance dated Dec. 26, 2013 in U.S. Appl. No. 13/149,676.
Abadi, et al., "Dynamic Typing in a Statically Typed Language", Published Apr. 1991, Available at: http://www.hpl.hp.com/techreports/Compaq-DEC/SRC-RR-47.pdf, 35 pp.
Aho et al. "Code Generation Using Tree Matching and Dynamic Programming", Oct. 1989, ACM Transactions on Programming Languages and Systems, 11(4): 491-516. Abstract only.
Anderson, C., et al., "Towards Type Inference for JavaScript", 2005, ECOOP 2005, *Lecture Notes in Computer Science*, 3586: 428-452.
Aycock, "Aggressive Type Inference," 2000, in *Proceedings of the 8th International Python Conference*, pp. 11-20.
Balzarotti, Davide "Saner: Composing Static and Dynamic Analysis to Validate Sanitization in Web Applications", May 2008, Proceedings of 2008 IEEE Symposium on Security and Privacy, pp. 387-401, 15pp.
Biggar, P., et al., "Static analysis of dynamic scripting languages," Published 2009, Available at http://www.paulbiggar.com/research/wip-optimizer.pdf, 12pp.
Carson, Paul, "Source code models and their use in assessing software quality", University of Strathclyde, Glasgow, UK, Nov. 2007, 10 pp.
Chu-Carroll and Pollock, "Compiling and Optimizing Dynamic Parallel Programs", Published on: Jun. 24, 2005 Available at: http://www.eecis.udel.edu/~carroll/hpdc-tr.ps, 19pp.
Cox, A. et al., "Lexical Source-Code Transformation," Published 2004, in *Software Transformation Systems Workshop* 2004, 2pp.
Crockford, D., "JSMin—The JavaScript Minifier," Published on Dec. 4, 2003, Available at: http://www.crockford.com/javascripl/jsmin.html, 2pp.
Dolby, J., "Using Static Analysis for IDE's for Dynamic Languages," Published on Oct. 14, 2005, Available at: http://www.eclipse.org/org/langsymp/JulianDolby_paper.pdf, 8 pp.
Fairley, Richard, "Tutorial: Static Analysis and Dynamic Testing of Computer Software", Apr. 1978, *Computer*, pp. 14-23.
Foster, "Data Flow Analysis 1-15-411 Compiler Design", Alex Aiken, Oct. 5, 2004, pp. 44.
Furr et al., "Profile-Guided Static Typing for Dynamic Scripting Languages", Oct. 26, 2009, *Proceedings of the 24th ACM SIGPLAN Conference on Object Oriented Programming Systems Languages and Applications*, pp. 283-300.
Google search results "closure conversion dynamic programming language".
ip.com search results "break a block of source code into multiple smaller blocks of code", 5 pp.
JetBrains, "Reshaper 5: Coding Assistance," Published on Mar. 11, 2011, Available at: http://www.jetbrains.comIresharper/features/coding_assistance.html, 4pp.
Louden, K., "Compiler Construction: Principles and Practice," 1997, Available at: http://www.cs.aue.auc.dk/-akbar/2006/complierconsto6.html, 18pp.
Misek, J., et al., "Mapping of Dynamic Language Constructs into Static Abstract Syntax Trees," Aug. 18-20, 2010, 9th IEEE/ACIS International Conference on Computer and Information Science, 6pp.
Misek., J., et al., "Syntactic and Semantic Prediction in Dynamic Languages," Published 2009, In Soft. Eng. Research, Manage. & Appli., R. Lee & N. Ishii (Eds.), SCI 253, pp. 59-70. 12pp.
Muchnick, Steven S, "Advanced compiler design and implementation", Morgan Kaufmann Publishers, Aug. 19, 1997, pp. 169 and 371-372.
NetBeans, "Code Assistance in the NetBeans IDE Java Editor: A Reference Guide," Published on Mar. 11, 2011, Available at: http://netbeans.org/kb/docs/java/editor-codereference.html, 12pp.
Nokia Corporation, "QT Creator: Using the Editor," Published on Mar. 11, 2011, Available at: http://doc.qt.nokia .com/qtcreator-2 .1-snapshotlcreator-editor-using .html, 5 pp.

(56) References Cited

OTHER PUBLICATIONS

ReSharper, "Coding Assistance", Published on Jan. 8, 2009, Available at: http://www.jetbrains.com/reshaper/features/coding_assistance.html, 5pp.

Russo, Alejandro, "Dynamic vs. Static Flow-Sensitive Security Analysis", Jul. 2010, 23rd IEEE Computer Security Foundations Symposium, pp. 186-199.

Silvaco, "Source Edit: Source Code Editor Window", Published on Mar. 11, 2011, Available at: http://www.silvaco.com/examples/silos/section1/example16/, 2 pp.

Stackoverflow, "A Language for Semantic Analysis?" Published on Mar. 11, 2011, Available at: http://stackoverflow.com/ questions/1417120/a-language-for-semantic-analysis, 2 pp.

WebStorm, "Web Coding Made Smarter", Published on Dec. 28, 2010, Available at: http://web.archive.org2010228051701/http://jetbrains.com/webstorm/features/index.html, 8 pp.

Wolfram, "Mathematica Editor Advantages, "Published on Mar. 11, 2011, Available at: http://reference.wolfram.com/workbench/index.jsp?topic=/com.wolfram.eclipse.help/htmltasks/why.html, 3 pp.

International Search Report dated Apr. 3, 2014 in International Application No. PCT/US13/077901.

Wyk et al., "Adding Syntax and Static Analysis to Libraries via Extensible Compilers and Language Extensions," Published on Oct. 22, 2006, In proceedings of Library-Centric Software Design LCSD'06, Available at: http://www.msse.umn.edu/system/files/publications/vanwyk_lcsd.pdf, 10 pp.

* cited by examiner

EXTENDING A DEVELOPMENT ENVIRONMENT

BACKGROUND

To develop a software application for performing a computing task, a software developer typically writes source code for the software application that outlines the functionality of the software application. There are various types of languages available to the developer depending on the particular use of the software application, the computing environment in which the software application will be executed, and/or personal preferences of the software developer. For example, the language can be a statically-typed programming language in which the variable types are determined typically at compile-time. In another example, the language can be a dynamically-typed programming language that determines variable types at runtime.

Once the software developer writes the source code, if the environment in which the source code is to be executed requires executable code, the source code is compiled into executable code (or can be interpreted at execution time, depending on the system environment) using a compiler. A compiler is used to convert the source code into machine code that is directly executable on the computer system. The computing environment executes the executable code to implement the functionality of the source code. Along with compiling source code into executable code, conventional compilers can also help the software developer by outputting debug information. The software developer can use the debug information to fix potential problems in the source code that may lead to faults when executing the executable code during runtime.

It is with respect to these and other considerations that the disclosure made herein is presented.

SUMMARY

Concepts and technologies are described herein for extending a development environment. An extension can be consumed by a development tool to modify the behavior of the development tool for delineated source code elements. In some embodiments, the development tool can consume an extension to use extended behavior in various processes including, but not limited to, preprocessing, lexical analysis, syntactic analysis, static analysis, instruction scheduling, code generation, linkage, assembly, interpreting, and JIT compiling. For example, when extending the behavior of a compiler, an extension can be consumed by the compiler during various stages of the compilation process including, but not limited to, syntactic analysis, semantic analysis, code generation and code optimization. In a configuration when used within a compiler development environment, a compiler extension can provide a compiler with one or more runtime semantics of various source code elements for a particular programming language. In some configurations, an extension can be used in various programming operations such as, but not limited to, static analyzers, interpreters, compilers, linkers, assemblers, and emulators.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
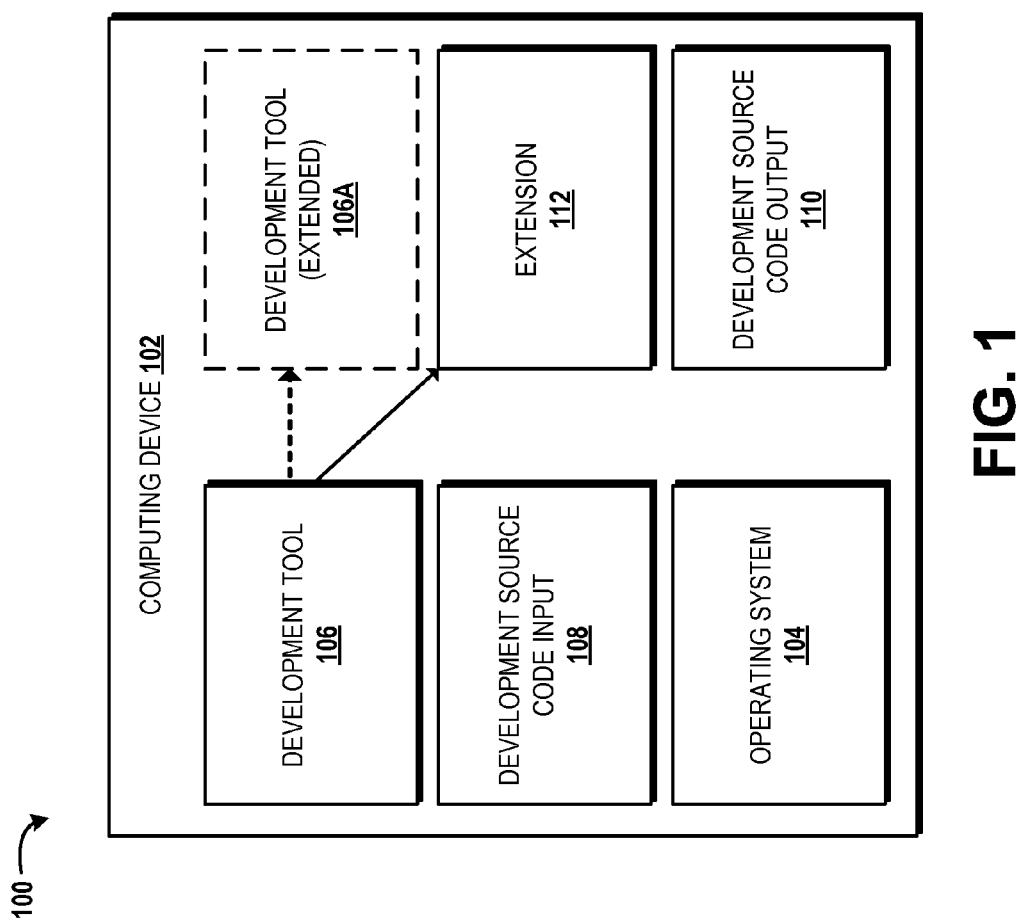
FIG. 1 is a system diagram of an illustrative operating environment that may be used to implement various embodiment disclosed herein.

The following detailed description is directed to extending the behavior of a software development tool. In various configurations, a software development tool is provided with an extension. The software development tool consumes the extension. The extension changes the behavior of the software development tool for delineated operations from a default mode to an extended mode. In some examples, a software development tool can be used in extended mode for various reasons, examples of which are described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for extending a source code development environment and other aspects will be presented.

Referring now to FIG. 1, aspects of a source code development environment 100 for the various embodiments presented herein will be described. The source code development environment 100 shown in FIG. 1 includes a computing device 102. In some embodiments, the computing device 102 can include a desktop computer, a laptop computer, a notebook computer, an ultra-portable computer, a netbook computer, or other type of computing device. An operating system 104 is executing on the computing device 102. The operating system 104 is an executable program for controlling various functions at the computing device 102.

The computing device 102 can execute a software development tool 106. The software development tool 106 can include programs or tools such as, but not limited to, static analyzers, interpreters, compilers, linkers, assemblers, and emulators. The software development tool 106 can receive an input file 108 that includes source code expressed in a programming language. The software development tool 106 can receive a command or instruction to perform various development operations on the source code in the input file 108.

It should be appreciated that the concepts and technologies described herein are not limited to any particular type of programming language. For example, the source code programming file type in the input file 108 can be expressed using a statically-typed programming language, a dynamically-typed programming language, or other types. Examples of statically-typed programming languages include, but are not limited to, C, Fortran, Java and Pascal. Examples of dynamically-typed programming languages include, but are not limited to, JavaScript, Perl, Lisp and VBScript. Other types include strong and weak types, safe and unsafe types, intersection types, union types, duck typing, and dependent types. It should be appreciated that the concepts and technologies described herein are not limited to any specific type. It should also be appreciated that the concepts and technologies described herein are not limited to a programming language that is one specific type, as some programming languages may be used as, or may be considered to be, various types.

In some configurations, the development operation may be an operation on the source code in the input file 108 that does not produce an output. In other configurations, the development operation may generate an output, illustrated in FIG. 1 as a development tool output 110. For example, if the software development tool 106 is a compiler and the operation is code generation, the development tool output 110 can include one or more output logical units expressed in executable code. As used herein, a "logical unit" includes a group of code blocks or statements that together form a logical cohesive whole. A logical unit can be a source code element or can include one or more source code elements to form a logical cohesive whole. The development tool output 110 may also include, but is not limited to, a viewable message, a query, a rewrite of one of more components of the input file 108, etc. The concepts and technologies described herein are not limited to any particular output.

In some instances, the software development tool 106 may not be configured, or have the capability, to understand the behavior of a source code element in the input file 108 upon which the software development tool 106 is performing a development operation. As used herein, a "source code element" includes, but is not limited to, a definition or a use of a function, class, method, variable, macro, template, procedure, closure, type, the source code file itself or referenced libraries. There may be various reasons why the software development tool 106 may not recognize or understand the behavior of the source code element.

For example, the software development tool 106 may not understand the behavior of a source code element if the behavior of the element will be decided during runtime. The logical unit can include a function that the software development tool 106 is not configured to recognize. In other instances, the software development tool 106 may be configured to perform an operation on a source code element that is insecure, outdated, or otherwise undesirable. In other instances, the source code element or the logical unit can include a misspelling that prevents recognition by the software development tool 106. In a further example in a compiler environment, the compiler may not understand the actual, runtime semantics of various functions during compile-time. It should be appreciated that these, and other, examples are merely exemplary. The concepts and technologies described herein are not limited to any specific limitation, fault, or undesired behavior of the software development tool 106.

To modify the behavior of the software development tool 106, the software development tool 106 may be configured to access and consume an extension 112 that extends (or modifies) the behavior of the software development tool 106 when performing various development operations. The software development tool 106 operating in extended mode is illustrated in FIG. 1 as a software development tool (extended) 106A. As used herein, to "extend" means the software development tool 106 consumes the extension 112 to expand, increase, and/or alter the capabilities of the source development tool 106. By extending the capabilities of the software development tool 106, the software development tool 106 can be configured to, for example and not by way of limitation, perform an operation it was not previously capable of performing. In other configurations, the software development tool 106 can be extended to the software development tool (extended) 106A to perform a modified operation on a source code element instead of performing a default operation in a non-extended mode. In some examples, the software development tool 106A can be extended to the software development tool (extended) 106A to perform an operation in extended mode in addition to an operation in a default or non-extended mode. For example, the extended mode may include additional operations on a source code element not performed in a default mode.

Figure 2:
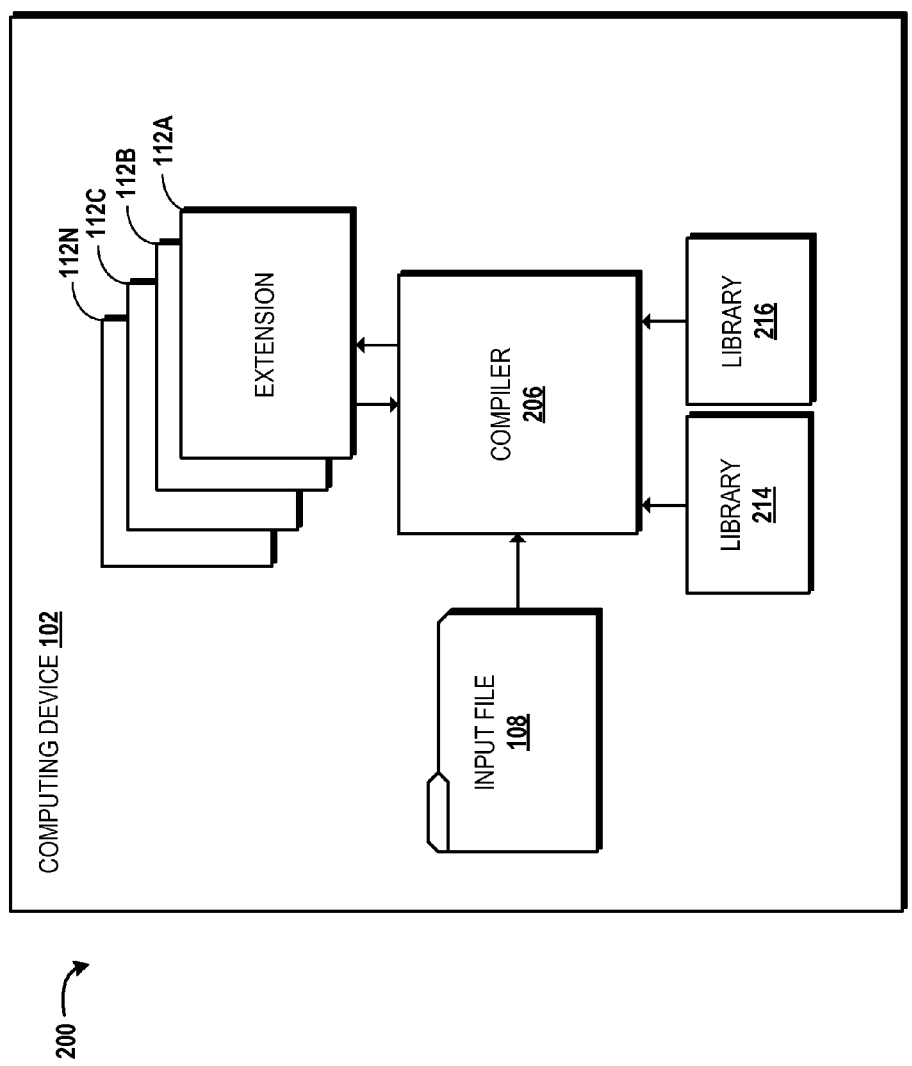
FIG. 2 is a system diagram of an illustrative compilation environment executing a compiler that may be used to implement various embodiments disclosed herein.

FIG. 2 is a functional block diagram illustrating a compilation environment 200 in which the software development tool 106 is a compiler 206. As described above, the concepts and technologies described herein are not limited to any particular development environment. Various illustrations and descriptions contained herein use a compiler environment for descriptive purposes only and do not represent an intent to limit the presently disclosed subject matter to only compiler environment. To perform a compilation operation, the compiler 206 can have within its programming necessary components to perform the compilation operation.

In some configurations, the compiler 206 may include an internal library 214, which in some configurations can be a collection of programs or executable code that can be consumed by the compiler 206 to perform various compilation operations. In some configurations, the compiler 206 can access a third-party library, such as an external library 216. In some configurations, the external library 216 can be a collection of programs or executable code not included in the internal library 214 (or the source code of the compiler 206) that can be consumed by the compiler 206 to perform various compilation operations. As used herein, a "library" includes code in binary form that can be consumed by a software development tool, such as the compiler 206. The internal library 214 and the external library 216 are illustrated in FIG. 1 as a single library for illustrative purposes only and does not reflect an intent to limit the present disclosure to a single library. The internal library 214 or the external library 216 can include functions, macros, class templates (depending on the particular compiler and executable code), and other units of program code that can be consumed from the source program.

As describe above, to handle certain compile-time operations, the compiler 206 can have programming in its code, may access the internal library 214 and/or may access the external library 216. For example, the compiler 206 can receive an instruction to perform a semantic analysis on Program Segment (I):
  int i;
  printf("% s\n", i); (I).

In some configurations, the compiler 206 can perform the semantic analysis on Program Segment (I) using components of the compiler 206. In other configurations, the compiler 206 can access the internal library 214 or the external library 216 (or both) when compiling Program Segment (I).

Although a conventional compiler may be able to perform a semantic analysis (or other compile-time operation) on Program Segment (I), errors may occur during runtime due to various compile-time conditions. If the behavior of a source code element is decided during runtime in a dynamically-typed programming language, an error can occur if the characteristics of the source code are not described statically during compile-time. As an example, the following JavaScript code includes a function called, "DefineNamespace," which may be provided by various libraries, including the internal library 214 and/or the external library 216:
  DefineNamespace('Utilities.File', {open: function(name) {/*code*/}});
  var file=Utilities.File.open('a.txt');

The name, "Utilities.File", will typically not be designated until runtime, at which time DefineNamespace is executed. A compiler performing semantic analysis on the code set forth above may not know whether or not this code executes properly at runtime. To reduce the probability that an error may be introduced by functions that conventionally pass compile-time analysis requirements, but during runtime, cause a program to run incorrectly, the compiler 206 can access extensions 112A-112N that can provide the compiler 206 with runtime semantics of various logical units so the compiler 206 can understand the logical units during compile-time (hereinafter the extensions 112A-112N are referred to collectively and/or generically as "extension 112"). In various configurations, providing the compiler 206 with runtime semantics can help the compiler 206 validate parameters associated with a logical unit.

The extension 112 can be created by and/or provided to the compiler 206 from various sources. For example, the extension 112 can be part of a software development kit supplied to developers for a particular operating environment. In another example, the extension 112 can be generated by one or more developers for use by other developers. In another example, a developer can author the extension 112 on top of the internal library 214, the external library 216, or other third party libraries. In a further example, the extension 112 can be part of the internal library 214 and/or the external library 216.

The compiler 206 can consume the extension 112 during compile-time to perform compilation operations on source code elements and/or logical units. In the first example above, the compiler 206 can be configured to detect that the "printf" function is a function to be treated according to the extension 112. In that configuration, the compiler 206 can consume the extension 112 to perform a compilation operation in extended mode rather than consuming an executable in the internal library 214 to perform the compilation operation in a default, or non-extended, mode. In the second example above, by consuming the extension 112, the compiler 206 can be configured to understand the "DefineNamespace" function behavior during runtime and mimic (or simulate) the behavior during compile-time by, in one example, creating an appropriate object.

The extension 112 may also provide the compiler 206 with the ability to recognize certain errors in the source code that may cause an error during runtime or may prevent a compilation operation from being completed. For example, if a developer writes source code for the function, "DefineNamespace" but does so in an erroneous way, the compiler 206 can consume the extension 112 to create various objects and determine that the function would generate errors when executed. For example, a developer may write a code segment in which the word, "open" is misspelled to be "oopen":
  DefineNamespace('Utilities.File', {open: function(name) {/*code*/}});
  var file=Utilities.File.oopen('a.txt').

The compiler 206 can consume the extension 112 to perform a successful semantic analysis on the code segment above. For example, the compiler 206 can consume the extension 112 to perform an operation in extended mode by populating a symbol table with one or more results of statically processing the code segment above. After creating the one or more results of the static processing, the compiler 206 can detect that the second line may cause a runtime error due to the misspelling of "open". In this example, if the compilation operation is a code generation operation, the compiler 206 can behave in extended mode after consuming the extension 112 and generate operable executable code. Without operating in an extended mode, the compiler 206 may generate inoperable code in the non-extended mode using default behavior. Some further examples are provided hereinbelow.

Traditionally, static analysis has been associated with static languages. For example, consider the following C code:

```
long aNumber;
void SomeFunction(int i) { /* function body */ }
void SomeOtherFunction( ) {
  XomeFunction( );
  aNumber = "hello";
}
```

In the example above, the compiler 206 can flag 2 semantic issues: the name "XomeFunction" does not exist; and aNumber is being assigned a "string" (technically, a pointer to an array of characters). The reason conventional C compilers can do this is because C is a static language. In a static language, the names and types of all language constructs are known during compile time. Even for static languages, certain checks usually cannot be performed until runtime—even if the names and types for all elements are known during compile time. For instance, consider the following C function:

```
date_t create_date(unsigned char day, unsigned char month, short int year){
  /* implementation */
}
```

This function is considered static. The function itself, all its parameters and their types, and its return type are all known during compile-time. However, certain class of errors can still happen during runtime. Consider the following examples of a consumer of the code above:

```
date_t date1 = create_date(29, 02, 2012); /* valid date, 2012 is a leap year
*/
date_t date2 = create_date(29, 02, 2010); /* invalid date, 2010 is not a leap year */
```

Both calls to the create_date function above are considered valid; the function exists, the number of arguments is correct, the types of the arguments are correct, the supplied values are within the expected range for the types, and the expected return type by the consumer matches the one declared by the function. However, only one of these dates is valid. Constructing date1 is going to work, but date2 is not. The behavior of the create_date function for date2 depends on how the function is implemented. For example, a runtime exception could be thrown, a special instance of date_t that signifies an error could be returned, and/or a valid instance of date_t that contains invalid data could be created.

As shown above, there are certain classes of checks that are traditionally performed during runtime, even for static languages. Testing software can be error-prone and expensive. Ideally, as many errors as possible should be caught during compile time or build time. If the create_date function is built-in the compiler, or part of the language's standard library, then the compiler can perform checks, raising an error for date2 above. The standard library is a set of pre-built libraries that ship with the compiler. Therefore, the compiler can be programmed to know about it.

However, if the create_date function above is not part of the standard library, then the compiler cannot perform any checks specific to that function. If a development team wants to perform checks specific to that function, additional tools would have to be written or consumed for such purpose. These tools could operate on: source code; object code; debug symbol files; or a combination of the aforementioned. These tools could be: standalone binaries; rules written for a semantic analyzer (tools such as FxCop, Lint, etc.); others; or a combination of the aforementioned. But, these tools can have several drawbacks. For example, they may need to be opted-in (i.e., the developer will need to turn on the tool/rule/etc. for each compilation location in their code base). Since they are not part of the compiler, they can fall out of sync with it (e.g., these tools can break if a new version of the compiler changes the layout of object file, for example). In other instances, they often need to duplicate functionality in the compiler (e.g., parsing, semantic analysis, etc.) in order to provide meaningful analysis.

To extend the behavior and/or functionality of the compiler 206, a plug-in model can be implemented. In the example above, consider that the imported declaration of the create_date function is changed to look like the following:

```
extension("date.dll")
date_t create_date(unsigned char day, unsigned char month, short int year)
{
/* implementation */
}
```

In the example above, date.dll is a library that contains one or more plug-ins to the compiler (i.e., compiler extensions). Specifically, it can include a plug-in that would extend the semantic analysis of the compiler, as follows:

```
void create_date(Array<IParameter> parameters,
IFunctionCallAnalysisAction action)
{
char day = –1, month = –1, year;
if (parameters.length < 3)
{
/* we will do nothing, since the compiler will
* have already errored on argument count mismatch
*/
return;
}
if (parameters[0].kind == pk_NumberLiteral)
{
day = (char)parameters[0].value;
if (day < 1 || day > 31)
{
RaiseError("invalid day");
}
}
/* etc . . . *
}
```

By running the extension 112 (i.e., plug-in) that is associated with the semantic analysis of calls to create_date, the compiler 206 can perform checks that would otherwise not have been possible during compile time.

In some configurations, for the semantic analysis phase, this can have the following advantages over the external tools mentioned above. The check can be relatively "cheap"—the cost of tool chaining other programs, constructing models, etc., is spared. The check can be performed by the compiler 206—there's no need to opt-in, it's going to be there, whenever the compiler 206 is used. There's no duplicate functionality with the compiler 206. And, the extension 112 is not out-of-sync with the compiler 206.

In the example above, the C language syntax has been augmented with keywords that can be used to specify the extension 112. Alternative implementations include, but are not limited to: the file containing the extensions needs to be declared explicitly using language syntax; external files mapping source elements to extensions; well-formatted comments in the source code (source code annotations); source attributes; and others. Other examples include, but are not limited to: the compiler can look for a DLL with the same file prefix as the file that contains the reference (e.g., for date.h, date.c or date.obj, the compiler would look for date.dll); the compiler could look for a script with the same base name (e.g., date.lua or date.js); a type library (e.g., COM) registered in the system, where the type library is specified; a type library (e.g., COM) registered in the system, where the type library is implicit; and the extensions could be located in the same unit as the reference (eg, date.h, date.c or date.obj). It should be understood that the concepts and technologies described herein are not limited to the implementations described above.

Continuing with the example above, the full path to the DLL has not been specified. Alternative implementations include, but are not limited to: the extension 112 path could be explicit; the extension 112 path could be implicit, where the compiler could search the current working directory, the source file directory, a predefined directory, a predefined system folder; the extension 112 path could be implicit, with the search path explicitly provided by the user vis-à-vis a command-line option with a list of directories to be searched in order or an in-source list of directories to be searched (e.g., by using #pragma directives); or the extension 112 path could be a global setting in the system such as the system registry or an environment variable. A further implementation may be to acquire the extension 112 dynamically across a network via and/or via a web service. The concepts and technologies are not limited to the implementations explicitly described herein, as other implementations may be used and are considered to be within the scope of the present disclosure.

In the example above, a separate DLL with binary code has been provided for the extension 112. Alternative implementations include, but are not limited to: scripting languages (such as JavaScript, Lua, etc.) can be used; the extension 112 can be the function itself, written as part of the source program; or the extension 112 can be a comment in the source program. The concepts and technologies are not limited to the implementations explicitly described herein, as other implementations may be used and are considered to be within the scope of the present disclosure.

In the example above, the name of the entry point in the extension DLL has not been provided. Alternative implementations include, but are not limited to: functions with the same name as the reference construct, where overloads are used to disambiguate different extensions for the same construct; functions with the same name as the reference construct, where name affixes are used to disambiguate different extensions for the same construct; the explicit name of the entry point needs to be provided; the offset in a v-table of the extension function; or the exported index of an exported function. The concepts and technologies are not limited to the implementations explicitly described herein, as other implementations may be used and are considered to be within the scope of the present disclosure.

In the example above, the implicit name matching is case sensitive. Alternative implementations include, but are not limited to: case sensitive; case insensitive; or specific capitalization rules (e.g., for affixes, etc.). The concepts and technologies are not limited to the implementations explicitly described herein, as other implementations may be used and are considered to be within the scope of the present disclosure.

In the example above, the compiler 206 behavior has been extended for function calls during the semantic analysis. Alternative source constructs that can be extended during semantic analysis include, but are not limited to: calls to overloaded operators; function references; type instantiation; variable reference; variable assignment; or pointer dereference. The concepts and technologies are not limited to the implementations explicitly described herein, as other implementations may be used and are considered to be within the scope of the present disclosure.

The example above raises errors for specific values passed to the function. Other actions available to the extension 112 include, but are not limited to: adding, modifying or deleting symbols in the symbol table; operating on the syntax tree of the input document; raising errors and warnings; changing the suppression state of errors and warnings; creating, modifying and deleting source elements such as types, enums, constant values, macros, or namespaces; or performing file operations. The concepts and technologies are not limited to the implementations explicitly described herein, as other implementations may be used and are considered to be within the scope of the present disclosure.

The example above shows an extension that is provided with a library. This is not the only way to author and distribute extensions. Other ways to author and distribute extensions include, but are not limited to: extensions for libraries that are distributed alongside the libraries themselves such standard library extensions that are distributed with the compiler; extensions developed by a different vendor than the library for the standard library; or extensions developed by the consumer of a library to enforce specific usage defined by the team architect or to help migrate to a new version of the library.

The example above does not show the license for extensions. Some licenses include, but are not limited to: same license as the library; license to use the library conditional to license to use the extension 112; an open source license; a closed-source, but free-to-use license; or a proprietary, paid-for license. The example above also does not show the compiler 206 behavior if the extension 112 is not found, or has an error. Some approaches include, but are not limited to: raise an error; raise a warning; log the failure and proceed; log the failure and abort; do nothing and ignore the failure; provide in-source directives for specifying what to do; or provide mechanisms for specifying what to do alongside the extension declaration.

The example above shows how extensions can be used by a compiler of a static language. Extensions can used for dynamic languages as well. Consider the following JavaScript example:

```
WinJS.Namespace.define("Utilities.File", {
open: function(name) {
/* implementation */
}
});
var f = Utilities.File.open("foo.txt");
```

In the example above, a call to a library function (WinJS.Namespace.define) will create the name Utilities.File.open. In a dynamic-type language, the name creation does not happen until runtime. Statically, the example above does not contain the name Utilities.File.open. Utilities.File is merely a string being passed to a function. Traditionally, since programs written in dynamic languages (such as JavaScript) can create and delete names during runtime (as in the example above), static analyzers for such languages are not be able to raise issues regarding non-existing names. Extensions can be used to increase the quality of semantic analysis of dynamic programs. In the example above, an extension can be provided to the WinJS.Namespace.define function, which can perform the following steps: check the first parameter; if it is not a string, exit extension; parse the string parameter; and/or create all the necessary symbols, if they do not exist By running the extension 112 described above on calls to WinJS.Namespace.define, a static analyzer can have knowledge of the names to be created during runtime. The semantic analyzer described above would then be able to flag violations. For instance, consider the following program, similar to the previous one, but with a typo:

```
WinJS.Namespace.define("Utilities.File", {
open: function(name) {
/* implementation */
}
});
var f = Utilities.File.oopen("foo.txt");
```

A semantic analyzer can be configured to flag the typo, since the requested name ("oopen") cannot be found in the symbol table. The compiler 206 can be triggered to access the extension 112 when compiling the source code in the input file 108 using various mechanisms. For example, the compiler 206 can be configured to check for the extension 112 when performing a compilation operation on each logical unit of the source code in the input file 108. In another configuration, the compiler 206 can be configured to access the extension 112 based on a compile-time instruction set, including an extension input that designates the logical units to be extended. For example, the compiler 206 can be instructed at compile-time to process only specified or pre-determined logical units with the extension 112. The pre-determined logical units or source code elements to be treated according to the extension 112 can be stored in a list accessible to the compiler 206. It should be appreciated that other logical units or source code elements may be treated using the extension 112. The concepts and technologies disclosed herein are not limited to any particular element or logical unit.

Other triggers for retrieving and consuming the extension 112 can include, but are not limited to: the association of the extension 112 with the appearance of any identifier, such as 'foo'. In conventional JS runtimes, for example, some keywords that were previously legal might no longer be legal (as they have been reserved for use in the language). The concepts and technologies described herein can implement an algorithm for consistently rewriting these identifiers so that they are consistent/no longer collide with reserved keywords. Another trigger may be that the extension 112 has been associated with a call site to a specific function or routine. On encountering a call site that resolves to a specific/uniquely identified symbol (a function, a properly, a specific variable), invoke the extension. The extension might alter/rewrite or even remove the call site. Or, it might simply examine the call site in order to create some in-memory information that can itself be used for further diagnostics/code emit, etc. The namespace construction example falls into this scenario. For this, the call site to the API that produces an in-memory class at runtime may not be modified in any way. Instead, symbols can be created for the types/members that would be produced at runtime, so that subsequent references to them can be verified in code.

Another trigger may be to associate the extension 112 with the construction of a specific class. For example, on any occurrence of 'new Foo( )', the extension 112 is invoked. This implementation may also be used to drop in a replacement class or to halt compilation due to attempt to take a dependency on a forbidden type. A further trigger may be to associate the extension 112 with a reference to a specific library/binary/external reference. For example, if a program links to an obsoleted version of a library, v1, that is insecure, various configurations of the extension 112 can alter compilation to force this program to link to an updated/more secure version. In one example, the extension 112 for a logical unit can force a reference to a logical unit to a reference to a functional equivalent. A still further trigger may be to associate the extension 112 with an abstract syntax tree node kind An additional configuration may be to associate the extension 112 with a lexical token kind.

The compiler 206 can also be configured to retrieve and consume the extension 112 for source code elements or logical units that are not explicitly designated, but rather, are implicitly designated. For example, the compiler 206 can be configured to consume the extension 112 for logical units or source code elements having the same name as other logical units or source code elements in the source code. In another example, the compiler 206 can be configured to consume the extension 112 for logical units or source code elements that have the same spelling, but disregard any differences in capitalization. In another example, the extension 112 can be provided for logical units or source code elements having commonly misspelled names. In that example, the compiler 206 can be configured to consume the extension 112 corresponding to the misspelled logical units or source code element. The extension 112 may be configured to correct the misspelling. In another configuration, the extension 112 may be associated with every type that implements a specific interface. In a further configuration, the extension 112 may be associated with all types that extend a specific base type.

Figure 3:
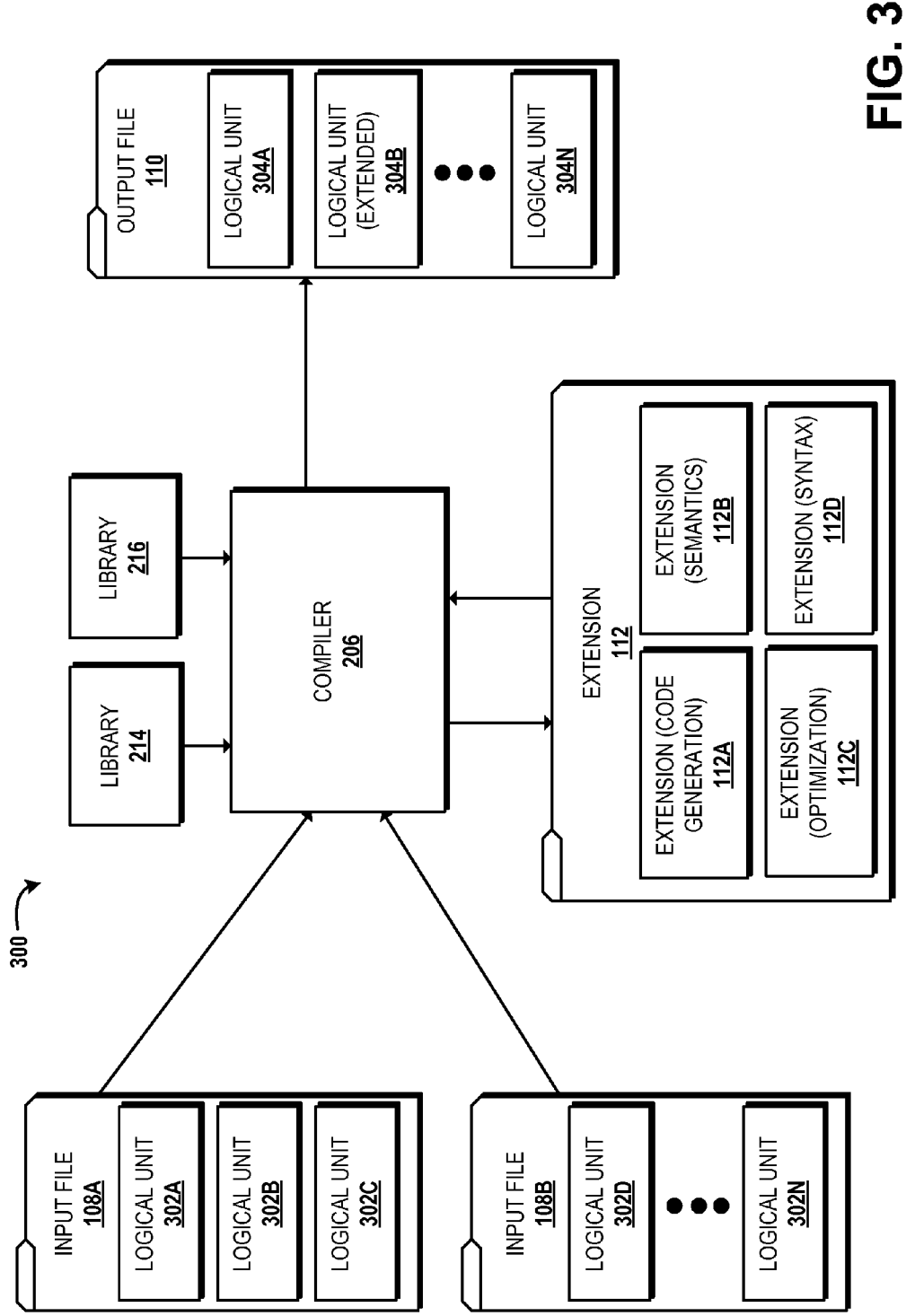
FIG. 3 is functional block diagram illustrating a compilation environment in which a logical unit of source code is treated according to an extension, in accordance with some embodiments.

FIG. 3 is a block diagram illustrating a compilation environment 300 in which a logical unit of source code is treated according to the extension 112. In FIG. 3, the compiler 206 has access to the internal library 214, the external library 216 and the extension 112. An input file 108A includes source code with logical units 302A-302C. An input file 108B includes source code with logical units 302D-302N (hereinafter referred to collectively and/or generically as "logical units 302"). It should be understood that concepts and technologies described herein are not limited to any input file 108 configuration, as various configurations may include one input and other configurations may include a plurality of input files, such as the input file 108A and the input file 108B.

The compiler 206 can be configured to determine if the compiler 206 is to operate in extended mode for a particular logical unit of the logical units 302. It should be understood that the compiler 206 can be configured to check for an extension using various trigger mechanisms, such as those described herein. For example, the compiler 206 can determine if the extension 112 is to be consumed for a development operation by checking an extensions file for the extension, looking for the extension by computing an extension file name based on a name or identifier associated with an input, inspecting a metadata inlined with compilation units, looking for a DLL with a same file prefix as a file that contains a reference, and looking for a script with a same base name. The compiler 206 can receive an instruction to perform a compilation operation on the input file 108A and the input file 108B. In response to receiving the instruction, the compiler 206 can execute a compilation operation on the logical units 302.

In one configuration, the compiler 206 can execute a compilation operation on the logical units 302 to create executable code (code generation) in the development tool output 110, illustrated in FIG. 3 as logical units 304A-304N (hereinafter referred to collectively and/or generically as "logical units 304"). It should be appreciated that the logical units 304 in the development tool output 110 may include logical units that do not directly correspond, in a 1:1 relationship, to the logical units 302 in the input file. For example, during a code generation compilation operation, the logical units 304 may be generated from one or more of the logical units 302 or may be generated by the compiler 206 as a logical unit unrelated to any particular logical unit of the logical units 302.

The compiler 206 can be configured to detect that a logical unit 302D is to be compiled by consuming the extension 112. As described above, the extension 112 can be consumed during various compilation operations such as, but not limited to, syntactic analysis, semantic analysis, optimization and code generation. In the configuration illustrated in FIG. 3, the compiler 206 can commence a code generation operation on the logical unit 302D. The compiler 206 consumes the extension (code generation) 112A of the extension 112 to perform a code generation operation on the logical unit 302D in an extended mode. The compiler 206 can generate an output logical unit, which is illustrated as logical unit (extended) 204D in the logical units 304 of the development tool output 110. It should be understood that the designation of "extended" for the logical unit (extended) 304B means that the logical unit was generated using an extended compiler mode after the compiler 206 consumes the extension (code generation) 112A.

If performing another compiler operation, the compiler 206 may be configured to use other extensions based on the operation. For example, extension (semantics) 112B can be consumed by the compiler 206 during a semantic analysis operation for the logical unit 302D. In another example, extension (optimization) 112C can be consumed by the compiler 206 during an optimization operation for the logical unit 302D. In a further example, extension (syntax) 112D can be consumed by the compiler 206 during a syntactic analysis operation for the logical unit 302D.

It should be appreciated that the concepts and technologies described herein are not limited to any specific operation of the compiler 206. It should further be understood that it is not necessary to consume an extension for all logical units or source code elements in a source code file. For example, an extension might be consumed by the compiler 206 for an element of the source code, such as logical unit 302D, for certain compilation operations and not consumed in other compilation operations. Further, as described above, it should be appreciated that the compiler 206 can be configured to consume extensions for source code elements or logical units other than functions. For example, and not by way of limitation, the compiler 206 can be configured to consume an extension for functions, classes, methods or variables, or other elements. The concepts and technologies disclosed herein are not limited to the execution of an extension of any particular logical unit or source code element.

Various embodiments of the concepts and technologies described herein can give a developer certain degree of flexibility with regard to writing source code. Some examples are described above. An additional example of an implementation of the concepts and technologies described herein is the transformation of a legacy programming language (or legacy version) into an updated version of the programming language, a different programming language, or an updated version of a consumed library. As used herein, "legacy" means source code or a programming language that has been replaced with another source code or programming language. For example, legacy source code can be a version of source code that predates a currently used version of source code. In another example, legacy source code can be source code in a programming language that predates a currently used programming language. In a further example, an input can be source code targeting a legacy version of a library or a system, where the output can be a computer program that can operate on a new version of the library or the system.

Figure 4:
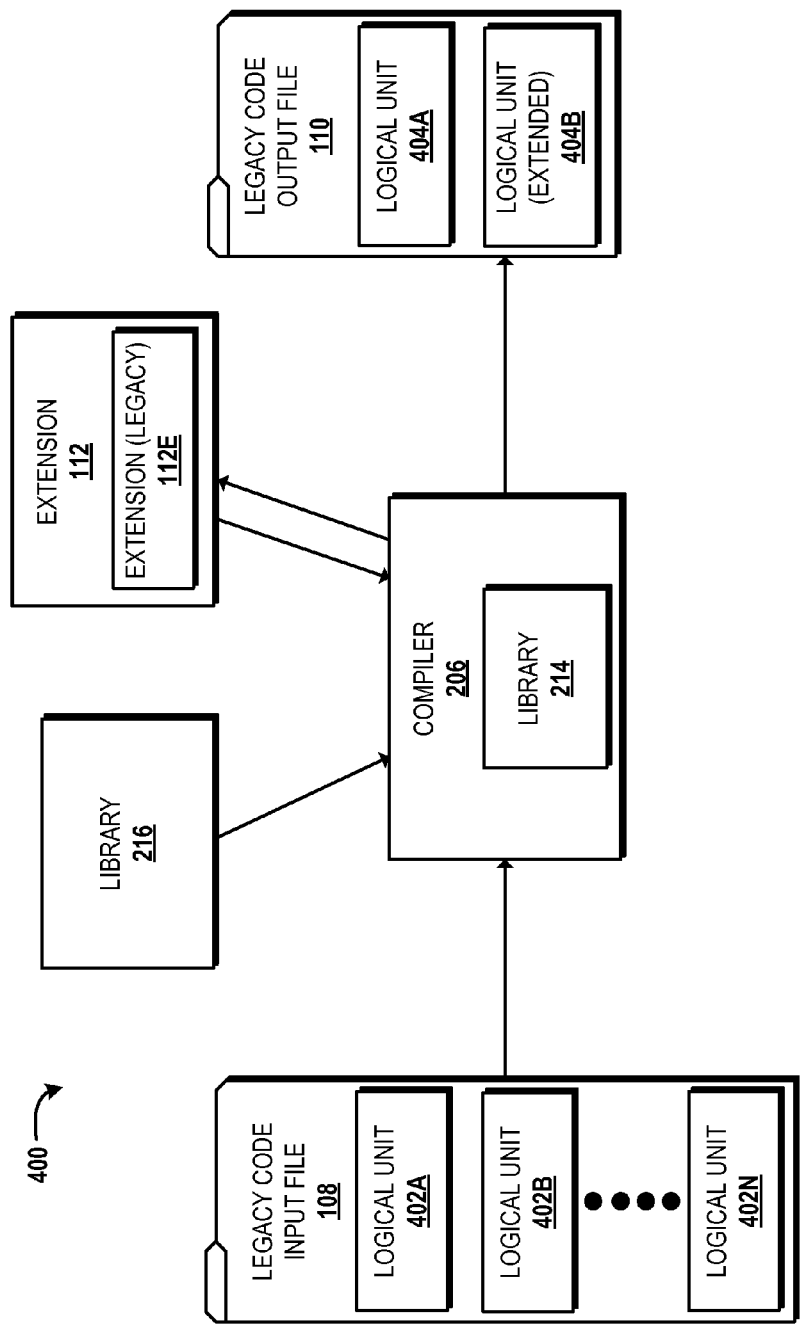
FIG. 4 is functional block diagram illustrating the transformation of legacy source code into executable code for an updated operating environment, in accordance with some embodiments.

FIG. 4 is a functional block diagram illustrating the use of various concepts and technologies described herein to transform legacy code into code for use in an updated system. A legacy code input file 108 includes logical units 402A-402N (hereinafter referred to collectively and/or generically as "logical units 402") included in the legacy code input file 108. The logical units 402 form at least a part of the source code for a legacy program. If a developer wishes to use logical units 402 in an updated system, such as a new environment, the developer may be required to modify various portions of the legacy units 402 so that the legacy units 402 can be executed in the new environment.

In the configuration illustrated in FIG. 4, if the compiler 206 uses the external library 216 during a code generation operation, the logical units that are generated when the code generation operation is complete may not function properly or as desired in the new environment. This may occur for various reasons. For example, the logical units 402 may include a logical unit that is not used in the environment that executes the executable code in the development tool output 110, which can include legacy code. In another example, the logical units 402 may include a function with variables that are no longer used in the environment that executes the development tool output 110.

To provide the developer with the capability to update the logical units 402 when the compiler 206 compiles the logical units 402, the extension 112 can include a extension (legacy) 112E. The extension (legacy) 112E can be consumed by the compiler 206 to extend the behavior of the compiler 206. In one configuration, the extension (legacy) 112E can be consumed by the compiler 206 during a code generation operation to generate code written in a first version of a programming language to a second version of the programming language. For example, the legacy extension 112E can be consumed by the compiler 206 to generate executable code for logical unit (extended 404B) of logical units 404A-404N (hereinafter referred to collectively and/or generically as "logical units 404"), which can include source code logical units compatible with the new environment. It should be understood that the use of the term "legacy" associated with the extension (legacy) 112E means in this configuration that the extension is an active (or currently used) extension associated with a legacy version of a library, source code element, environment, etc.

Figure 5:
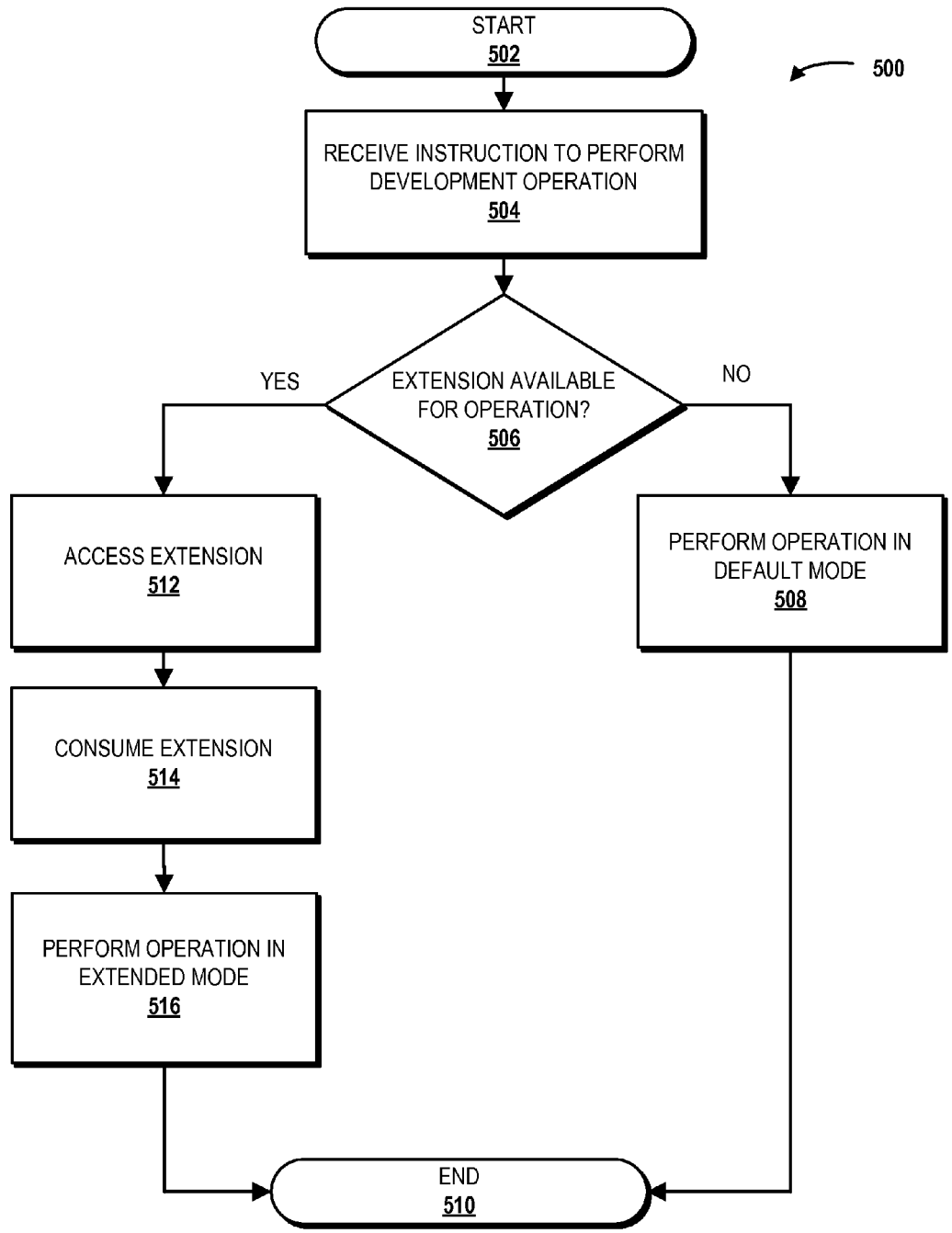
FIG. 5 is a block diagram illustrating an exemplary method for extending a software development tool, in accordance with some embodiments.

Turning now to FIG. 5, aspects for extending a software development tool 106 are provided, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. The operations of the methods are described herein below as being implemented, at least in part, by the software development tool 106, the compiler 206, the internal library 214, the external library 216, the extension 112, or combinations thereof.

Turning to FIG. 5, the method 500 begins at operation 502 and proceeds to operation 504, where the software development tool 106 receives an instruction to perform a development operation. As described above, a development operation can include, but is not limited to, preprocessing, lexical analysis, syntactic analysis, static analysis, instruction scheduling, code generation, linkage, assembly, interpreting, emulating and JIT compiling.

From operation 504, the method 500 proceeds to operation 506, where the software development tool 106 determines if an extension 112 is available for the operation. As described above, the operation can be various operations on various source code elements or logical units. For example, the software development tool 106 can receive an instruction to generate code for a particular logical unit. The software development tool 106 can determine if an extension is available for generating code for the particular logical unit. If no extension is available for the operation, the method 500 proceeds to operation 508, where the software development tool 106 performs the operation in a default (or non-extended) mode. The method 500 then ends at operation 510.

If an extension is available for the operation, the method 500 proceeds to operation 512, where the software development tool 106 accesses the extension 112. The extension 112 may be accessible to the software development tool 106 from various sources. For example, the extension 112 may be a separate file that includes executable code provided by a third party developer. In another example, the extension 112 may be loaded into the internal library 214 of the software development tool 106.

From operation 512, the method 500 proceeds to operation 514, where the software development tool 106 consumes the extension 112. By consuming the extension, the software development tool 106 is configured to perform the operation in an extended mode rather than a default, or any other, mode. It should be understood that the extension 112 is not limited to operations that are performed on a source code element or logical unit. For example, the extension 112 may configure the software development tool 106 to perform an operation on the external library 216, the internal library 214, or the software development tool 106. The concepts and technologies described herein are not limited to operations on input files.

From operation 514, the method 500 proceeds to operation 516, where the software development tool 106 performs the operation in the extended mode. The extended mode for the software development tool (extended) 106A can be initiated or abated depending on the particular configuration of the software development tool 106. For example, a developer may want the software development tool 106 to operate in a default mode during one period of time and operate in an extended mode (106A) in other periods of time. For example, a system may experience security issues when a program calls certain application programming interfaces. The extension 112 may be made available for consumption by the software development tool 106 to cause the software development tool 106 to generate code that causes the program to call a secure API. When the security issue is finalized, the software development tool 106 can be reprogrammed to generate the necessary code. Thus, in this example, the extension 112 is temporary. The method 500 then ends at operation 510.

Figure 6:
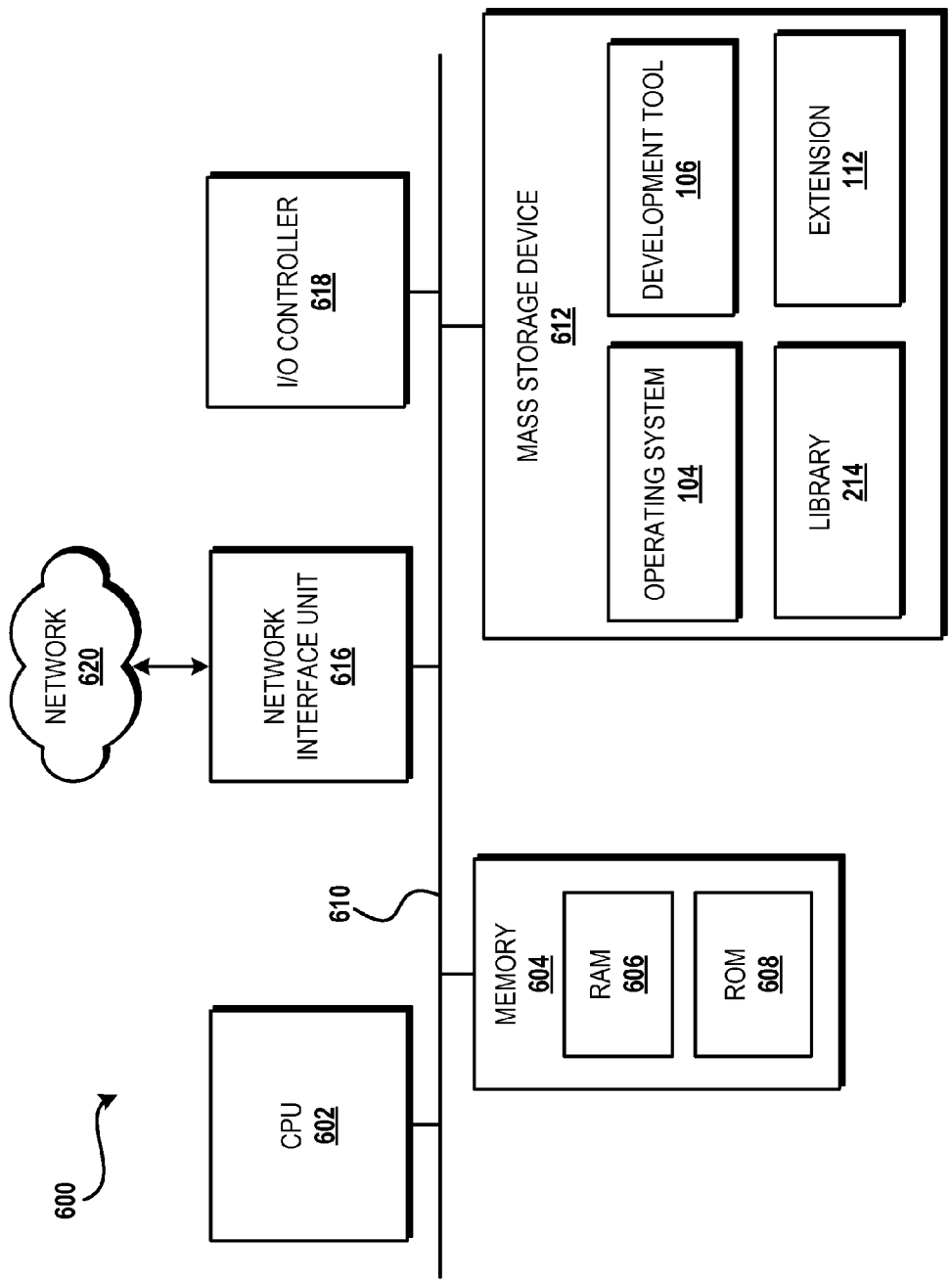
FIG. 6 is a computer architecture diagram illustrating an illustrative computer hardware and software architecture for a computing system capable of implementing aspects of the embodiments presented herein.

FIG. 6 illustrates an illustrative computer architecture 600 for a device capable of executing the software components described herein for providing the concepts and technologies described herein. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit ("CPU") 602, a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 104 from FIG. 1 and one or more application programs or files including, but not limited to, the software development tool 106, the internal library 214 and the extension 112.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 600. For purposes of the claims, the phrase "computer storage medium," and variations thereof, does not include waves or signals per se and/or communication media.

According to various embodiments, the computer architecture 600 may operate in a networked environment using logical connections to remote computers through a network such as the network 620. The computer architecture 600 may connect to the network 620 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus. Similarly, the input/output controller 618 may provide an output to a display screen, a printer, or other type of output device.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture that is different in some manner than that shown in FIG. 6.

Based on the foregoing, it should be appreciated that concepts and technologies for extending the behavior of a software development tool have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for performing a source code development operation, the method comprising:
   receiving an input file comprising source code including at least one logical unit;
   receiving an instruction to perform a development operation on the at least one logical unit;
   in response to receiving the instruction to perform the development operation on the at least one logical unit, determining if an extension is to be consumed for the development operation; and
   if the extension is to be consumed for the development operation,
      retrieving the extension,
      changing to an extended mode by consuming the extension, and
      performing the development operation on the at least one logical unit in the extended mode.

2. The method of claim 1, wherein the development operation is one or more of preprocessing, lexical analysis, syntactic analysis, semantic analysis, instruction scheduling, code generation, linkage, assembly, interpreting, and JIT compiling.

3. The method of claim 1, wherein the at least one logical unit comprises one or more of a definition or a use of a function, a class, a method, a variable, a macro, a template, a procedure, a scope, a closure, a type, a directive, the source file itself or a library.

4. The method of claim 1, wherein the development operation is a compilation operation that comprises a syntactic analysis operation, a semantic analysis operation, a code optimization operation, a code generation operation, or a combination thereof.

5. The method of claim 4, wherein the extension comprises an extension for the syntactic analysis operation, the semantic analysis operation, the code optimization operation, or the code generation operation.

6. The method of claim 1, wherein determining if the extension is to be consumed for the development operation comprises receiving an extension input designating one or more logical units to be operated on in the extended mode.

7. The method of claim 1, wherein determining if the extension is to be consumed for the development operation comprises one or more of:
   checking an extensions file for the extension;
   looking for the extension by computing an extension file name based on a name or identifier associated with an input; and
   inspecting a metadata inlined with compilation units.

8. The method of claim 1, wherein retrieving the extension comprises retrieving a previously consumed extension or one-off loading if the extension has not previously been consumed.

9. A computer, comprising:
a processor; and
a computer-readable storage medium in communication with the processor, the computer-readable storage medium comprising computer-executable instructions stored thereupon which, when executed by the processor, cause the processor to
receive an input file comprising at least one logical unit to be compiled;
receive an instruction to perform a compilation operation on the at least one logical unit;
in response to receiving the instruction to perform the compilation operation, determine if an extension is to be consumed for the at least one logical unit at the time the at least one logical unit is to be compiled; and
if the extension is to be consumed for the logical unit,
retrieve the extension for the at least one logical unit, and
change to an extended mode by consuming the extension prior to performing the compilation operation on the at least one logical unit, and
perform the compilation operation on the at least one logical unit using the extension.

10. The computer of claim 9, wherein the logical unit comprises one or more of a definition or a use of a function, a class, a method, a variable, a macro, a scope, a template, a procedure, a closure, a type, a directive, the source file itself, or a library.

11. The computer of claim 9, wherein the compilation operation comprises one or more of a syntactic analysis operation, a semantic analysis operation, a code optimization operation, a code generation operation, or a combination thereof.

12. The computer of claim 11, wherein the extension comprises an extension for the syntactic analysis operation, an extension for the semantic analysis operation, an extension for the code optimization operation, or an extension for the code generation operation.

13. The computer of claim 9, wherein the at least one logical unit is source code targeting a legacy version of a library or a system and an output is a computer program that can operate on a new version of the library or the system.

14. The computer of claim 9, wherein determine if the extension is to be executed for the at least one logical unit at the time the at least one logical unit is to be compiled comprises receiving an extension input designating one or more extendable logical units to be extended or check an extensions file for the extension for the at least one logical unit.

15. The computer of claim 9, wherein the extension for the at least one logical unit comprises forcing a reference to a logical unit to a reference to a functional equivalent.

16. A computer-readable storage medium comprising computer-executable instructions stored thereupon which, when executed by a computer, cause the computer to:
receive an input file to be compiled from a second programming language into a first programming language, the input file comprising a plurality of logical units in the second programming language;
receive an instruction to perform code generation on the plurality of logical units in the input file;
in response to the instruction to perform code generation, analyze a first logical unit of the plurality of logical units;
determine if an extension is associated with the first logical unit of the plurality of logical units;
if an extension is associated with the first logical unit of the plurality of logical units,
change to an extended mode by consuming the extension associated with the first logical unit;
if an extension is not associated with the first logical unit of the plurality of logical units,
access a library,
compile the first logical unit into the compiled first logical unit without consuming the extension, and
output the compiled first logical unit into an output file in the first programming language.

17. The computer-readable storage medium of claim 16, wherein the logical unit comprises one or more of definition or a use of a function, a class, a method, a variable, a macro, a scope, a template, a procedure, a closure, a type, a directive, the source file itself, or a library.

18. The computer-readable storage medium of claim 16, wherein determine if an extension is associated with the first logical unit of the plurality of logical units comprises accessing an extended logical unit list that provides a list of logical units to be extended.

19. The computer-readable storage medium of claim 16, wherein determine if an extension is associated with the first logical unit of the plurality of logical units comprises checking an extensions file for the extension for the first logical unit of the plurality of logical units.

20. The computer-readable storage medium of claim 16, wherein the extension for the first logical unit of the plurality of logical units is implicitly designated to be the extension for the first logical unit of the plurality of logical units.

* * * * *